(12) United States Patent
Wu et al.

(10) Patent No.: US 9,083,007 B2
(45) Date of Patent: Jul. 14, 2015

(54) CONTINUOUS PRISMATIC CELL STACKING SYSTEM AND METHOD

(75) Inventors: Yang Wu, Honolulu, HI (US); Xiang Li, Huzhou (CN); Evan House, Stafford, TX (US)

(73) Assignee: Microvast, Inc., Stafford, TX (US)

(*) Notice: Subject to any disclaimer, the term of this patent is extended or adjusted under 35 U.S.C. 154(b) by 0 days.

(21) Appl. No.: 13/640,904

(22) PCT Filed: Apr. 13, 2011

(86) PCT No.: PCT/US2011/032354
§ 371 (c)(1),
(2), (4) Date: Dec. 10, 2012

(87) PCT Pub. No.: WO2011/130433
PCT Pub. Date: Oct. 20, 2011

(65) Prior Publication Data
US 2013/0111739 A1    May 9, 2013

Related U.S. Application Data

(60) Provisional application No. 61/323,600, filed on Apr. 13, 2010.

(51) Int. Cl.
| | |
|---|---|
| H01M 2/14 | (2006.01) |
| H01M 6/00 | (2006.01) |
| H01M 10/04 | (2006.01) |
| H01M 10/052 | (2010.01) |
| H01M 10/0585 | (2010.01) |

(52) U.S. Cl.
CPC .......... *H01M 6/005* (2013.01); *H01M 10/0404* (2013.01); *H01M 10/0413* (2013.01); *H01M 10/052* (2013.01); *H01M 10/0585* (2013.01); *Y02E 60/122* (2013.01); *Y02T 10/7011* (2013.01); *Y10T 29/49114* (2015.01); *Y10T 29/53135* (2015.01)

(58) Field of Classification Search
CPC ........................................................ H01M 6/005
USPC ............................................. 29/623.1–623.4
See application file for complete search history.

(56) References Cited

U.S. PATENT DOCUMENTS

| | | | |
|---|---|---|---|
| 6,544,684 B2 | 4/2003 | Onishi et al. | |
| 6,692,543 B1 | 2/2004 | Hamano et al. | |
| 2006/0112539 A1* | 6/2006 | Kejha et al. ................... | 29/623.4 |
| 2006/0159999 A1 | 7/2006 | Kejha et al. | |
| 2007/0102846 A1 | 5/2007 | Itoh et al. | |

FOREIGN PATENT DOCUMENTS

| | | | |
|---|---|---|---|
| GB | 2328427 A | * | 2/1999 |
| GB | 2328427 A1 | | 2/1999 |

* cited by examiner

*Primary Examiner* — Nicholas P D'Aniello
(74) *Attorney, Agent, or Firm* — Baker & McKenzie LLP

(57) ABSTRACT

A continuous prismatic cell stacking system and method are disclosed. The continuous prismatic cell stacking system, comprises: a frame; a conveyer belt; a plurality of air suction pans; at least three units for distributing separator including separator spool, positioning sensor of separator layer, upper roller of separator layer, lower roller of separator layer and cutter of separator layer; at least one unit for distributing cathode including cathode spool, positioning sensor of cathode layer, upper roller of cathode layer, lower roller of cathode layer, and cutter of cathode layer; and at least one unit for distributing anode including anode spool, positioning sensor of anode layer, upper roller of anode layer, lower roller of anode layer, and cutter of anode layer.

6 Claims, 1 Drawing Sheet

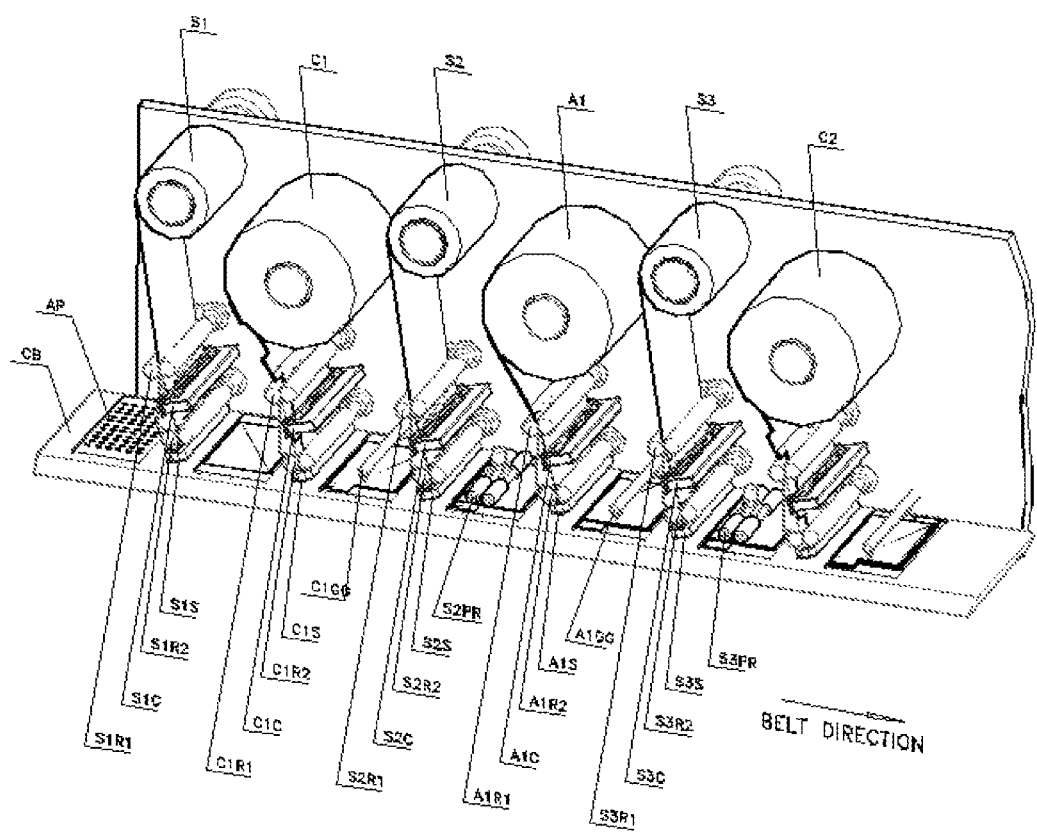

CONTINUOUS PRISMATIC CELL STACKING SYSTEM AND METHOD

CROSS REFERENCE TO RELATED APPLICATIONS

This application is a U.S. National Phase Entry pursuant to 35 U.S.C. §371 of PCT/US2011/032354, filed Apr. 13, 2011, which claims priority to U.S. Provisional Application Ser. No. 61/323,600, filed Apr. 13, 2010, the disclosures of which are incorporated herein in their entirety.

STATEMENT REGARDING FEDERALLY SPONSORED RESEARCH

Not applicable.

FIELD OF THE INVENTION

This invention relates to a continuous prismatic cell stacking system and a method for the rapid manufacturing of prismatic cells in a large size format. More specially, the system and method are directed to successively stacking the separator layer-cathode layer-separator layer-anode layer-separator layer pattern for a lithium-ion secondary battery cell.

BACKGROUND OF THE INVENTION

In general, lithium-ion (Li-ion) batteries are principally used in consumer electronic devices such as lap top computers, cell phones, cameras, camcorders, and MP3 players. Li-ion batteries used in the above-mentioned devices can be made in a single electrochemical cell or multiple cells in series or parallel, depending upon power consumption needs. Lap top computer batteries usually include four to nine individual cells per pack. The cells used in these devices are typically small in capacity (<2 ampere hour ("Ah") typically). Cells used in consumer electronic devices are typically of a wound-electrode configuration. The structure is a long narrow structure having separator layers and electrode layers (cathode and anode layers) spiraled on a mandrel, forming a "jelly roll" structure. The jelly roll can be processed in the following ways:
  a. The jelly roll may be a tight spiral that is subsequently placed in a cylindrical can for further processing—i.e. 18650 and 26650 standard size round cells used in lap top computers and power tools. Here, "18" means that the can is 18 mm in diameter, and "65" means that the can is 65 mm in height. "0" has no meaning here.
  b. The jelly roll may be a compressed, flattened jelly roll that is subsequently placed in a plastic pack as is typically used in cell phone batteries, MP3 players and like-sized devices.

The wound format lends itself to rapid construction of the electrode/separator mass and large scale automation of the fabrication process. Typically, the electrode/separator mass can be wound in a few seconds (approximately 2 seconds). A single automated machine can construct millions of these cell structures in a typical operation over a short period of time. To date, 18650 and 26650 wound Li-ion cells are produced in large quantities, typically characterized by an electrochemical capacity often less than 4 Ah, depending on cell design and the electrode material chosen.

The wound cell design for large capacity power needs is not practical for a few reasons, including: (1) the processing practicality to maintain concentricity of all the wound electrodes; and (2) safety concerns due to thermal management issues when the battery is in a high rate charge or discharge mode.

While cells of less than 4 Ah capacity are typically of a wound-based construction, the large capacity cells ("large format" cells) are of a stacked construction. In this format, the electrode/separator mass includes a number of alternating layers of separator, then cathode (or anode) electrode, then separator, then anode (or cathode) electrode. This stacking arrangement can be repeated a number of times (for example, 50 times) to reach the desired cell capacity according to the cell design and specification.

Current processes for stacking large format cells depend on manual hand stacking or the use of a stacking machine that accommodates provisions for the automatic laying of the alternate layers of the electrode/separator mass. Typically each cathode and anode electrode sheet is cut to its size and shape in a separate process. Due to its thinness and propensity to acquire a static electrical charge during handling, an automatic machine provides a means to cut or fold the separator material (e.g., Z fold) as part of the stacking process to minimize handling. The electrode sheets are placed onto their respective alternating layers using a pick-and-place technique, whereby a single machine will pick up a single electrode layer and deposit it upon the cell stack. Typically the electrode is held onto the pick-up machine via a reduced air pressure (vacuum) applied at the point of contact of the machine and the electrode surface. The action of picking-up and depositing an electrode upon the stack occurs over the course of a few seconds (about 2 to about 5). In the case of a typical 25 composite electrode layer cell, the stacking will take from about 2 to about 5 minutes to complete.

An automated manufacturing system for a layered cell having an improved structure and a manufacturing process that simplifies and enhances assembling efficiency in a continuous process is needed.

BRIEF SUMMARY OF THE INVENTION

It is an objective of the current invention to provide a continuous prismatic cell stacking system and method. The method and system can rapidly produce large format prismatic cells as part of the overall battery manufacturing process. The method and system provide: means to cut variable sizes and shapes for individual electrode layers; means to cut variable sizes and shapes for the separator layer; means to handle the thin, prone to static charge separator layer; means to maintain tight tolerance with regard to positioning and retaining the position of electrode layers and separator layer within the stacking process; means to stabilize the electrode stack in terms of the undesirable shifting or repositioning of stack layers following completion of the stacking process and subsequent handling to complete the cell construction; and means to feed electrode and separator stock layers to the cutting sub-process such that contact to separator and electrode surfaces is eliminated or minimized with respect to current methods.

In order to achieve the above-mentioned objectives, the current invention provided a continuous prismatic cell stacking system, comprising: a frame; a conveyer belt; a plurality of air suction pans; at least three separator layer units for distributing separator layers, each unit comprising a separator spool, a separator positioning sensor, a separator upper roller, a separator lower roller, a separator cutter, and a separator press roller; at least one cathode layer unit for distributing a cathode layer, comprising a cathode spool, a cathode positioning sensor, a cathode upper roller, a cathode lower roller, and a cathode cutter; and at least one anode layer unit for distributing an anode layer, comprising an anode spool, an anode positioning sensor, an anode upper roller, an anode lower roller, and an anode cutter, wherein the conveyer belt is located on the frame to support the prismatic cell during stacking of each separator layer, cathode layer, and anode layer, wherein the conveyer belt conveys the prismatic cell along a designated direction; wherein, the air suction pans are located on the conveyer belt to secure the prismatic cell during movement; wherein the spools are located on the frame to hold one or more separator rolls, cathode rolls, and anode rolls; wherein the positioning sensors are located in each section of the separator layer unit, cathode layer unit, and anode layer unit to position the separator layer, the cathode layer, and the anode layer, respectively; wherein, the rollers are located on the frame, including an upper roller and a lower roller for each separator roll, cathode roll, and anode roll to pull down or hold the separator layer, the cathode layer, and the anode layer; wherein the cutters are located on the frame for each separator roll, cathode roll, and anode roll to cut the separator layer, the cathode layer, and the anode layer; wherein the press rollers are located on the frame to press the separator layer to the cathode layer or the anode layer to make a firm stack; and wherein the units are mounted to the frame in the following pattern: separator layer unit, cathode layer unit, separator layer unit, anode layer unit, separator layer unit, and so on.

Another embodiment of the current invention comprises a glue gun for each cathode layer and anode layer, said glue guns located on the frame for the cathode section and the anode section to place glue onto the separator layer beyond the two edges of the cathode layer or the anode layer.

The current invention also provides a method of continuously stacking a prismatic cell, which employs the above continuous prismatic cell stacking system. More specifically, the method comprises: successively stacking a separator layer, a cathode layer, a second separator layer, an anode layer, and a third separator layer ("S-C-S-A-S pattern"), so that each layer is supported in turn while it is being conveyed by a conveyor belt at high speed; engaging an air suction pan in each stacking location to maintain the prismatic cell steady while it is being conveyed at high speed; engaging a separator spool, cathode spool, separator spool, anode spool, and separator spool as a basic unit for stacking the prismatic cell so that each layer in the S-C-S-A-S pattern can be placed on top of each subsequently applied layer while the prismatic cell is being conveyed at high speed. The S-C-S-A-S layer pattern is designed to have two separator layers at each end.

In a preferred embodiment, a separator layer is between the cathode layer and the anode layer; engaging positioning sensors for each separator layer, cathode layer, and anode layer to ensure the respective layer is aligned at pre-set or pre-designated positions and locations; engaging rollers for each separator layer, cathode layer, and anode layer to push and place the respective layer to pre-set or pre-designated positions and locations. One or more of the rollers may also be configured to smooth the cutting burr of the cathode layer or the anode layer caused by the cutting process; engaging a cutter for each separator layer unit, cathode layer unit, and anode layer unit; engaging a glue gun located in both the cathode and anode layer units that can drop or lay glue dots or line onto the separator layer beyond the two edges of cathode layer or anode layer; and engaging press rollers to press the separator layer to make a firm stack.

In another aspect, the current invention includes a prismatic cell stacking system comprising a frame; a conveyer belt coupled to the frame to support each one of a plurality of separator layers, cathode layers, and anode layers, allowing the layers to travel in a designated direction; a plurality of air suction pans coupled to the conveyer belt to hold the prismatic cell during movement; a plurality of spools coupled to the frame to hold separator rolls, cathode rolls, and anode rolls; a plurality of positioning sensors to position the separator layers, the cathode layers, and the anode layers during the stacking process; a plurality of rollers coupled to the frame, including an upper roller and a lower roller for each separator section, cathode section, and anode section, to pull down or hold the separator layer, the cathode layer, and the anode layer; a plurality of cutters coupled to the frame for each separator section, cathode section, and anode section to cut the separator layers, the cathode layers, and the anode layers; a plurality of glue guns coupled to the frame for cathode section and anode section to place glue onto the separator layer beyond the two edges of the cathode layer or the anode layer; and a plurality of press rollers coupled to the frame within a second separator section.

BRIEF DESCRIPTION OF THE DRAWINGS

FIG. 1 is an embodiment of a continuous prismatic cell stacking system including a conveyer belt, spools, upper rollers, cutters, lower rollers, positioning sensors, and press rollers, which are mounted accordingly on a frame.

DETAILED DESCRIPTION OF THE INVENTION

The detailed descriptions of this current invention set forth below in connection with the drawings and examples are preferred embodiments of the current invention and are not intended to limit the invention solely to embodiments and forms described hereafter.

"Large format" lithium ion cells or batteries refer to cells or batteries having significant energy capacity or content in ampere hours ("Ah"). Large format cells are typically used in applications requiring a high quantity of cells such as electric vehicles. If small format cells are used, the battery pack will be a plurality of single cells connected either in parallel or in series to meet both voltage and current demands. Usually, when the applications involve high energy and power demands, such as in electric vehicles, it is common to use large format cells to reduce the complexity of the battery pack due to electrical connections. Large formal cells also reduce the failure probability because there are fewer individual cells connection in the battery pack or module. The energy and power needs for an electric vehicle are significantly larger than above-mentioned consumer electronic devices, usually in the range of 200-400 V and 100-500 Ah, depending on the type of electrical vehicle.

The following assumptions and calculations demonstrate why a continuous system and method of making a prismatic cell would facilitate realization of electrical vehicles:

A typical electrical vehicle may require 100 to 1,000 (or more) stack-based cells (the cell is manufactured by stacking a plurality of individual electrochemical cells having a separator/cathode/anode/separator or separator/anode/cathode/separator structure in order to meet a designed capacity) in order to meet capacity requirements of the application.

As it is anticipated or assumed that the electrical vehicle market will continue to increase in volume to levels of many percent of all types of vehicles produced, it is not unreasonable to predict that millions of electrical vehicles will soon be produced and sold per year.

If one assumes the production of 1,000,000 electrical vehicles per year, and each electrical vehicle uses 500 large format cells, then 500,000,000 cells would need to be stacked and manufactured.

Assuming 2 minutes per cell production capability using a current typical stacking machine, it will take 1,000,000,000 minutes to produce the cells for the 1,000,000 vehicles.

Assuming a typical stacking machine will operate 20 hours per day for 260 days per year, 3,205 [$10^9/(20\times60\times260)$=3,025] stacking machines will be required to supply the cell stacks.

In addition to the number of machines need for stacking, equipment for cutting the individual electrodes to size and shape are also needed. It is not desirable to mechanically contact the surface of an electrode at any time during the cell manufacturing process due to the possibility of damage and the resulting performance and safety issues that such damage may cause. Thus the practice of pick-and-place as used in current cell stacking equipment is undesirable. Based on above calculations, 3,205 stacking machines involve a lot of capital expenditure and occupy significant space. One who is working in the battery industry would appreciate the value and usefulness of current invention to address the production efficiency in fabricating or manufacturing prismatic cells.

Embodiments of the current invention are distinguished from prior applications primarily in that many prismatic cells can be stacked on the same machine simultaneously by a continuous method to stack multiple prismatic cells. Some of the advantages of the current invention can be illustrated from the following calculations:

If one still assumes the production of 1,000,000 electrical vehicles per year and each electrical vehicle uses 500 large format cells, then 500,000,000 cells would need to be stacked and manufactured.

Further, assume the large format cell is made by 43 layers of separator/cathode/anode/separator stacked upon each other (22 separator layers, 11 cathode layers, and 10 anode layers).

It takes approximately 3 seconds for placing a separator layer, or cathode layer, or anode layer on the pre-designated area on the conveyer belt according to the current invention, then [(22+11+10)×3=129 seconds] approximately 130 seconds will be needed to stack one prismatic cell.

To simplify the calculation, after the first prismatic cell stacking process is completed, the second cell stacking process will be done in approximately 3 seconds afterwards, because the second cell has been layered simultaneously when the first cell was stacked.

Using 3 seconds per cell stacking production capability according to the current stacking system and method, it will take 25,000,000 minutes (1,500,000,000 seconds) to produce the cells for the 1,000,000 vehicles.

Assuming a typical machine will operate 20 hours per day and for 260 days per year, approximately 80 [$2.5\times10^7/(20\times60\times260)$=80] stacking systems are necessary in order to supply the cell stacks. This increases the stacking efficiency to almost 40 times (120/3=40) according to the current invention.

The advantages of the current invention are that the rapid stacking system can be easily adjusted for different production capacities and different sizes of prismatic cell manufacturing. The system can stack each cell in seconds. The system will significantly reduce the capital investment and space needed for building a large battery plant.

More specially, in one embodiment of the invention, a method of stacking a prismatic cell, comprising: successively stacking a separator layer, a cathode layer, a second separator layer, an anode layer, and a third separator layer ("S-C-S-A-S pattern") so that each layer is supported in turn while it is being conveyed at high speed on a conveyor belt; engaging an air suction pan in each stacking location that maintains the prismatic cell steady while it is being conveyed at high speed; engaging a first separator spool, a cathode spool, a second separator spool, an anode spool, and a third separator spool as a basic unit for stacking the prismatic cell so that each layer of the S-C-S-A-S pattern can be placed on top of the subsequent layer while it is being conveyed at high speed. The S-C-S-A-S layer pattern is designed to have separator layers at each end. In a preferred embodiment, a separator layer is between cathode layer and anode layer; engaging positioning sensors for each separator layer, cathode layer, and anode layer to ensure the layer is at pre-set or pre-designated positions or locations; engaging two rollers for each separator section, cathode section, and anode section to push and place the said layer to pre-set or pre-designated positions or locations. One of the rollers also functions to smooth the cutting burr of either the cathode layer or the anode layer caused by a cutting process; engaging a cutter for each separator layer unit, cathode layer unit, and anode layer unit; engaging a glue gun located in both the cathode layer unit and the anode layer unit that can drop or lay glue dots or lines onto the separator layer beyond the two edges of cathode layer or anode layer; and engaging press rollers to press the outer separator layer to make a firm stack.

In another embodiment of the current invention, the prismatic cell stacking system comprises: a frame; a conveyer belt on the frame to support each one of a plurality of a separator layer, a cathode layer, and an anode layer, the conveyor belt causing the prismatic cell to travel along a designated direction; air suction pans located on the conveyor belt to hold the prismatic cell during movement; spools located on the frame to hold a separator roll, a cathode roll, and an anode roll; a plurality of positioning sensors to position the separator layer, the cathode layer, and the anode layer during the stacking process; rollers located on the frame including an upper roller and a lower roller for each separator layer unit, cathode layer unit, and anode layer unit to pull down or hold the separator layer, the cathode layer, and the anode layer; cutters located on the frame for each of the separator layer unit, the cathode layer unit, and the anode layer unit to cut the separator layer, the cathode layer, and the anode layer; glue guns located on the frame within the cathode layer unit and the anode layer unit to place glue onto the separator layer beyond the two edges of the cathode layer or the anode layer; further press rollers located on the frame for each separator layer unit except for the first separator layer unit in series.

An embodiment of the current invention is described hereunder in detail, with reference characters illustrated in FIG. 1. For convenience and reference, the legend used in FIG. 1 is defined as follows: "CB" refers to the Conveyer Belt; "AP" refers to the Air Suction Pan; "S1" refers to the First Separator Spool; "S1S" refers to the First Separator Positioning Sensor; "S1R1" refers to the First Separator Upper Roller; "S1R2" refers to the First Separator Lower Roller; "S1C" refers to the First Separator Cutter; "C1" refers to the First Cathode Spool; "C1S" refers to the First Cathode Positioning Sensor; "C1R1" refers to the First Cathode Upper Roller; "C1R2" refers to the First Cathode Lower Roller; "C1C" refers to the First Cathode Cutter; "C1GG" refers to the First Cathode Glue Gun; "S2" refers to the Second Separator Spool; "S2S" refers to the Second Separator Positioning Sensor; "S2R1" refers to the Second Separator Upper Roller; "S2R2" refers to the Second Separator Lower Roller; "S2C" refers to the Second Separator Cutter; "S2PR" refers to the Second Separator Press Roller; "A1" refers to the First Anode Spool; "A1S"

refers to the First Anode Positioning Sensor; "A1R1" refers to the First Anode Upper Roller; "A1R2" refers to the First Anode Lower Roller; "A1C" refers to the First Anode Cutter; "A1GG" refers to the First Anode Glue Gun; "S3" refers to the Third Separator Spool; "S3S" refers to the Third Separator Positioning Sensor; "S3R1" refers to the Third Separator Upper Roller; "S3R2" refers to the Third Separator Lower Roller; "S3C" refers to the Third Separator Cutter; and "S3PR" refers to the Third Separator Press Roller In this embodiment (FIG. 1), a prismatic cell stacking system is provided with the following functions to stack a plurality of prismatic cells sequentially or continuously:

System startup to obtain a separator layer, a cathode layer, a second separator layer, an anode layer, and a third separator layer basic unit: as the first separator layer unit begins operation, a first separator spool (S1), a first separator upper roller (S1R1) and a first separator lower roller (S1R2) are operated simultaneously. When the first separator spool (S1) reaches a pre-set point determined by a first separator layer positioning sensor (S1S), the first separator spool (S1), first separator upper roller (S1R1), and first separator lower roller (S1R2) are stopped simultaneously. A first separator cutter (S1C) cuts the separator layer from the separator spool, placing the first separator layer for stacking; a conveyer belt (CB) moves and the first separator layer is pushed by the first separator lower roller (S1R2) onto the conveyor belt where a negative pressure air suction pan (AP) collects the first separator layer and holds it securely on the conveyor belt (CB). During this time, a first cathode spool (C1), a first cathode upper roller (C1R1) and a first cathode lower roller (C1R2) operate simultaneously to set the cathode layer to the designated position. A first cathode cutter (C1C) will cut the cathode layer from the first cathode spool (C1) to be placed on top of the incoming separator layer; when the first separator layer reaches a pre-set position, the cathode lower roller (C1R2) pushes the cut first cathode layer onto the first separator layer and the cathode upper roller (C1R2) will smooth the cutting burr of the cathode layer. The first separator layer is air permeable so that the suction pan may also hold the first cathode layer onto the first separator layer. During the process of placing the cut first cathode layer, a first cathode glue gun (C1GG) may distribute two glue lines or multiple dots onto the first separator layer beyond the two edges of the first cathode layer; the first separator layer and first cathode layer are transferred to the second separator layer unit via the conveyor belt (CB). During this time, the second separator layer unit begins operation. The second separator spool (S2) and second separator upper roller (S2R1) and second separator lower roller (S2R2) are operated simultaneously. When the second separator layer reaches the pre-set point, the second separator spool (S2), second separator upper roller (S2R1) and second separator lower roller (S2R2) are stopped simultaneously. Then the second separator cutter (S2C) cuts the second separator layer rapidly; when first separator layer and cathode layer move to the pre-set position, the second separator lower roller (S2R2) pushes the second separator layer onto the first cathode layer. The glue gun glues the first and second separator layers together. The second separator press roller (S2PR) will press the second separator layer onto the first cathode layer to make a firm stack; after the second separator layer is placed, the conveyer belt moves the prismatic cell into position for placing the first anode layer. During this time, the first anode spool (A1), first anode upper roller (A1R1) and first anode lower roller (A1R2) operate simultaneously, setting a first anode layer to the pre-designed position. First anode cutter (A1C) cuts the anode layer from the anode spool (A1) to be placed on the top of the second separator layer; when second separator layer and first cathode layer move to the pre-set position, the first anode lower roller (A1R2) pushes the first anode layer onto the second separator layer. During the process of stacking the first anode layer, a first anode glue gun (A1GG) will make two glue lines or multi-dots onto the second separator layer beyond the two edges of the first anode layer; when the second separator layer and the first anode layer moves to the next position, the third separator section begins operation. The third separator spool (S3), third separator upper roller (S3R1) and third separator lower roller (S3R2) operate simultaneously. When the third separator layer reaches the pre-set point, the third separator spool (S3), third separator upper roller (S3R1) and third separator lower roller (S3R2) are stopped simultaneously. The third separator cutter (S3C) cuts the third separator layer rapidly, leaving the third separator layer ready for stacking; and when the third separator layer and the first anode layer move to the pre-set position, the third separator upper roller (S3R2) pushes the third separator layer onto the first anode layer. The glue gun will glue the second and the third separator layers together. The third separator press roller (S3PR) will press the third separator layer onto the first anode layer to make a firm stack.

System in process to repeat above-described process: the above-described process may be sequentially repeated for stacking more or less complexly designed prismatic cells. If the cell design is to have 11 cathode layers and 10 anode layers, the number of separator layers will be 22. Since the process is designed to have the first cathode layer placed onto a separator layer, there is always one more cathode layer than anode layer if the prismatic cell is designed to have more than one individual electrochemical cell inside. The cell will have a separator layer placed first and last, sandwiching the cathode and anode layers.

Future system in process to weld and pack prismatic batteries simultaneously: upon placing of the last separator layer, the conveyer positions the cell stack within a cell termination ultrasonic weld station. Aluminum, or other metal current collector termination material, will be fed from roll stock, cut to length and positioned upon the uncoated exposed electrode (cathode or anode) towards the outer edge of the conveyer belt where a series of ultrasonic welds penetrate and weld the stacked cathode or anode layers together, welding them to the termination material. The electrode stack is then turned in the plane of the conveyer 180° and the material feed, cutting, positioning and weld sequence are repeated for the other electrode (cathode or anode).

Various modifications in structure and/or function may be made by one skilled in the art to the disclosed embodiments without departing from the scope of the invention as described above and defined by the claims.

We claim:

1. A method of forming a prismatic cell stack comprising a plurality of stacked prismatic cell layers comprising:
   transporting an air suction pan along an inlet conveyor to a plurality of stacking stations;
   collecting one of the plurality of prismatic cell layers onto the air suction pan at each of the plurality of stacking stations to form the prismatic cell stack, wherein the prismatic cell layers collected onto the respective air suction pan for least some of the plurality of stacking stations comprises a stacking layer that is at least one of a separator layer, a cathode layer, or an anode layer,
      wherein the collecting of the stacking layers for at least some of the plurality of stacking stations comprises:
      engaging a spool consisting of a continuous sheet of the respective separator layer, the cathode layer, or the anode layer;

cutting the continuous sheet to form a cut portion of the stacking layer;

engaging a plurality of rollers to push and place the cut portion of the stacking layer to pre-set positions; and engaging at least one position sensor to ensure that the cut portion of the stacking layer is aligned to the pre-set positions; and adhering the cut portion of the stacking layer onto the prismatic cell stack.

2. The method of claim 1, wherein the prismatic cell stack comprises a first layer, a second layer, a third layer, a fourth layer, and a fifth layer, and wherein the first layer, the third layer, and the fifth layer comprise a cut portion of the separator layer.

3. The method of claim 1, wherein the prismatic cell stack comprises a cut portion of the separator layer between a cut portion of the cathode layer and a cut portion of the anode layer.

4. The method of claim 1, wherein at least one of the plurality of rollers is configured to smooth a cutting bun of the cut portion of the stacking layer.

5. The method of claim 1, wherein the plurality of rollers comprises an upper roller and a lower roller.

6. The method of claim 1, wherein adhering the stacking layer onto the prismatic cell stack further comprises distributing a glue onto the separator layer and pressing the cut portion of the stacking layer onto the prismatic cell stack using a press roller.

* * * * *

UNITED STATES PATENT AND TRADEMARK OFFICE
CERTIFICATE OF CORRECTION

| | | |
|---|---|---|
| PATENT NO. | : 9,083,007 B2 | Page 1 of 1 |
| APPLICATION NO. | : 13/640904 | |
| DATED | : July 14, 2015 | |
| INVENTOR(S) | : Yang Wu, Xiang Li and Evan House | |

It is certified that error appears in the above-identified patent and that said Letters Patent is hereby corrected as shown below:

In the Claims

Column 9, lines 19-21,
Claim 4 should read:

-- 4. The method of claim 1, wherein at least one of the plurality of rollers is configured to smooth a cutting burr of the cut portion of the stacking layer. --

Signed and Sealed this
Eighth Day of March, 2016

Michelle K. Lee
*Director of the United States Patent and Trademark Office*